United States Patent
Gupta et al.

[19]

[11] Patent Number: 5,839,107
[45] Date of Patent: Nov. 17, 1998

[54] METHOD AND APPARATUS FOR AUTOMATICALLY GENERATING A SPEECH RECOGNITION VOCABULARY FROM A WHITE PAGES LISTING

[75] Inventors: Vishwa Gupta, Brossard; Michael Sabourin, St-Lambert, both of Canada

[73] Assignee: Northern Telecom Limited, Montreal, Canada

[21] Appl. No.: 757,610

[22] Filed: Nov. 29, 1996

[51] Int. Cl.$^6$ .................................................. G10L 3/00
[52] U.S. Cl. .................. 704/270; 704/243; 704/231; 707/102
[58] Field of Search .................. 707/104, 102, 707/5, 3; 704/270, 243, 231

[56] References Cited

U.S. PATENT DOCUMENTS

| | | | |
|---|---|---|---|
| 4,164,025 | 8/1979 | Dubnowski et al. | 364/900 |
| 4,751,736 | 6/1988 | Gupta et al. | 381/31 |
| 4,751,737 | 6/1988 | Gerson et al. | 381/43 |
| 4,797,910 | 1/1989 | Daudelin | 379/67 |
| 4,956,865 | 9/1990 | Lennig et al. | 381/43 |
| 4,959,855 | 9/1990 | Daudelin | 379/213 |
| 4,979,206 | 12/1990 | Padden et al. | 379/67 |
| 5,050,215 | 9/1991 | Nishimura | 381/41 |
| 5,052,038 | 9/1991 | Shepard | 379/88 |
| 5,086,479 | 2/1992 | Takenaga et al. | 382/14 |
| 5,091,947 | 2/1992 | Ariyoshi et al. | 381/42 |
| 5,097,509 | 3/1992 | Lennig | 381/43 |
| 5,127,055 | 6/1992 | Larkey | 381/43 |
| 5,163,083 | 11/1992 | Dowden et al. | 379/88 |
| 5,181,237 | 1/1993 | Dowden et al. | 379/88 |
| 5,204,894 | 4/1993 | Darden | 379/88 |
| 5,226,044 | 7/1993 | Gupta et al. | 370/81 |
| 5,274,695 | 12/1993 | Green | 379/88 |
| 5,307,444 | 4/1994 | Tsuboka | 395/22 |
| 5,390,278 | 2/1995 | Gupta et al. | 395/2.52 |
| 5,488,652 | 1/1996 | Bielby et al. | 379/88 |
| 5,515,475 | 5/1996 | Gupta et al. | 395/2.51 |

OTHER PUBLICATIONS

Y. Gao et al., "Dynamic Adaptation of Hidden Markov Model for Robust Speech Recognition", IEEE International Symposium on Circuits and Systems, vol. 2, May (1989), pp. 1336–1339.

Gorin et al., "Adaptive Acquisition of Language", *Computer Speech and Language,* vol. 5:101–132, (1991).

M. Lennig et al., "Flexible Vocabulary Recognition of Speech Over the Telephone", IEEE Workshop on Interactive Technology of Telecom Applications, Oct. 1992, pp. 1–3.

M. Lennig et al., "Automated Bilingual Director Assistance Trial in Bell Canada", IEEE Workshop on Interactive Voice Technology for Telecom Applications, Oct. 1992, pp. 1–4.

M. Lennig, "Putting Speech Recognition to Work in the Telephone Network", Computer Published by IEEE Computer Society, vol. 23, No. 6, Aug. 1990, pp. 35–41.

Rabiner, L. R. and B. H. Juang, "An Introduction to Hidden Markov Models", *IEEE ASSP Magazine,* (Jan. 1986), pp. 4–16.

(List continued on next page.)

*Primary Examiner*—David R. Hudspeth
*Assistant Examiner*—Harold Zintel

[57] ABSTRACT

The invention relates to a method and apparatus for automatically generating a speech recognition vocabulary for a speech recognition system from a listing that contains a number of entries, each entry containing a multi-word identification data that distinguishes that entry from other entries in the list. The method comprises the steps of creating for each entry in the listing a plurality of orthographies in the speech recognition vocabulary that are formed by combining selected words from the entry. The words combination is effected by applying a heuristics model that mimics the way users formulate requests to the automated directory assistance system. The method is particularly useful for generating speech recognition vocabularies for automated directory assistance systems.

57 Claims, 4 Drawing Sheets

OTHER PUBLICATIONS

Bakis, R. and A. G. Cole, "Dynamic Modification of the Vocabulary of a Speech Recognition Machine", *IBM Technical Disclosure Bulletin*, vol. 27, No. 7A, (Dec. 1984), pp. 3945–3946.

Lennig, M. and D. Sharp, "Unleashing the Potential of Human–To–Machine Communication", *Telesis*, No. 97, pp. 23–27.

Lennig, M., "Putting Speech Recognition to Work in the Telephone Network", *Computer,* (Aug. 1990), pp. 35–41.

Young, S., "Large Vocabulary Continuous Speech Recognition: a Review", *Proceedings, IEEE Automatic Speech Recognition Workshop,* (Dec. 10–13, 1995), pp. 3–28.

METHOD AND APPARATUS FOR AUTOMATICALLY GENERATING A SPEECH RECOGNITION VOCABULARY FROM A WHITE PAGES LISTING

FIELD OF THE INVENTION

This invention relates to a method and an apparatus for automatically performing desired actions in response to spoken requests. It is particularly applicable to a method and an apparatus for automatically providing desired information in response to spoken requests, as may be used to partially or fully automate telephone directory assistance functions.

BACKGROUND OF THE INVENTION

In addition to providing printed telephone directories, telephone companies provide telephone directory assistance services. Users of these services call predetermined telephone numbers and are connected to directory assistance operators. The operators access directory databases to locate the directory listings requested by the users, and release the telephone numbers of those listings to the users.

Because telephone companies handle a very large number of directory assistance calls per year, the associated labor costs are very significant. Consequently, telephone companies and telephone equipment manufacturers have devoted considerable effort to the development of systems which reduce the labor costs associated with providing directory assistance services.

In a typical directory assistance system the caller is first prompted to provide listing information, in other words to specify in what area resides the business or individual whose telephone number he seeks. If valid speech is detected, the speech recognition layer is invoked in an attempt to recognize the unknown utterance. On a first pass search, a fast match algorithm is used to select the top N orthography groups from a speech recognition dictionary. In a second pass the individual orthographies from the selected groups are re-scored using more precise likelihoods. The top orthography in each of the top two groups is then processed by a rejection algorithm which evaluates if they are sufficiently distinctive from one another so the top choice candidate can be considered to be a valid recognition.

Usually the speech recognition dictionary that contains the orthographies potentially recognizable by the speech recognition layer on a basis of a spoken utterance by a user is created from screened tokens. These are actual call records in which are stored the spoken request by the user. This information allows to determine how people verbally formulate requests in connection with a certain entity whose telephone number is being sought. For example, the business "The First Wall of Glass Company" on Wilmington street, may be requested in a variety of different ways, such as "Wall of Glass", "First Wall of Glass on Wilmington", First Wall of Glass Company" and "Wall of Glass on Wilmington", among others. After examining the different formulations associated with the entity, orthographies are created, where each orthography corresponds to an particular request formulation. Thus, for each entry in the white pages a number of orthographies are produced that collectively form a speech recognition vocabulary. In practice, not all possible formulations are retained to avoid creating extremely large speech recognition vocabulary that may not be able to offer real-time performance. Only the formulations that occur the most often are retained.

Although the use of screened tokens allows to construct a precise speech recognition vocabulary that well reflects the manner in which spoken requests are formulated, this method is time consuming and very expensive to put in practice. Indeed, a large number of screened tokens are required to construct a useful vocabulary, in the order of 50,000 to 100,000.

Thus, there exists a need in the industry to develop automated methods for generating a speech recognition vocabulary that at least partially reduces the reliance on screened tokens to complete this task.

OBJECTS AND STATEMENT OF THE INVENTION

An object of the present invention is to provide a method for generating a speech recognition vocabulary from a listing containing a plurality of entries.

Another object of the present invention is to provide an apparatus for generating a speech recognition vocabulary from a listing containing a plurality of entries.

A further object of the invention is a computer readable medium containing a program element that instructs a computer to process a listing to generate a speech recognition vocabulary.

The present inventors have made the unexpected discovery that a useful speech recognition vocabulary may be automatically created by applying to a listing a heuristics model that simulates the manner in which spoken requests can be made. Typically, the listing contains entries, names of individuals for example, that the speech recognition system can potentially identify based on a spoken utterance by the user. In a specific example, the listing may be a white pages list that is a source of information associating an entity name, such as an individual or a business with a telephone number or some pointer leading to a telephone number. Most preferably, the white pages also provide civic address information for each entity. In essence, the heuristics model observes the different words from which the entry in the entry in the listing is constructed and combines those words in a different manner to create orthographies that mimic the way a query of that particular entry is likely to be made.

As embodied and broadly described herein the invention provides a method for generating a speech recognition vocabulary for use in a speech recognition system, the method comprising the steps of:

providing a computer readable medium containing a listing of a plurality of entity identifiers, each entity identifier including at least one word that symbolizes a particular meaning, said plurality of entity identifiers being distinguishable from one another based on either one of individual words and combinations of individual words, at least some of said entity identifiers including at least two separate words;

generating for each one of said at least some of said entity identifiers an orthography set including a plurality of orthographies, each orthography in a given set being a composition of different words and at least one of said different words being selected from a respective entity identifier;

storing said orthography set on a computer readable medium in a format such that the orthographies of said set are potentially recognizable by a speech recognition system on a basis of a spoken utterance by a user.

In a preferred embodiment, the above defined method is used to generate a speech recognition vocabulary for use in an automated directory assistance system. The list of entity identifiers is a white pages listing that is a database providing for each entry, information such as name and civic address. The particular heuristics model selected to generate the orthography set for each entry combines different words from the various database fields to produce individual orthographies having different levels of expansion, i.e., containing different informations. In a very specific example, one orthography may consist of the first word of the name field. Another orthography may consist of the full name of the entity. Yet, another orthography may be formed by associating the full name and some elements of the civic address, such as the street name. In most instances, each orthography of a given set will share at least one word with another orthography of the set. This, however, is not a critical feature of the invention as it is very well possible to develop heuristics models that produce an orthography set where no common word is shared between a certain pair of orthographies.

The list containing the entity identifiers is in a computer readable format so it may be processed by a computer programmed with the selected heuristics model to generate the speech recognition vocabulary. The particular format in which the various words forming the entity identifiers are stored or represented in the computer readable medium is not critical to the invention.

In another embodiment of the invention the entity identifier includes title information in addition to the name and civic address data. The title information is used by the particular heuristics model to develop orthographies that contain the title of the particular entity. In a specific example, an entity identifier may include the following information elements:

| FULL NAME | STREET | NUMBER | LOCALITY |
|---|---|---|---|
| Little Red Cars | Bottomo | 987 | Sunshine Beach |

After applying the following heuristics model;
Full Name
Full Name+Street
Full Name+Locality
Full Name+Street+Locality
The set of orthographies will be as follows:
Little Red Cars
Little Red Cars on Bottomo
Little Red Cart in Sunshine Beach
Little Red Cars on Bottomo in Sunshine Beach In a different example the entity identifier includes the following information elements:

| FULL NAME | STREET | NUMBER | LOCALITY | TITLE |
|---|---|---|---|---|
| Bill Titus | Smart | 1234 | Montreal | Attorney |

After applying the following heuristics model:
Full Name
Full Name+Street
Full Name+Locality
Full Name+Street+Locality
Full Name+Title
Full Name+Title+Street
The set of orthographies will be as follows:
Bill Titus
Bill Titus on Smart
Bill Titus in Montreal
Bill Titus on Smart in Montreal
Bill Titus Attorney
Bill Titus Attorney on Smart In the above examples it will be noted that the orthographies in each set share among them at least one common word, namely "Little", "Red" and "Cars" for the earlier example, while in the latter example "Bill" and "Titus" are common words.

The heuristics model used to generate the orthography sets may be simple or of a more complex nature. For example, the model may be such as to generate a first orthography based on the first word in the entity identifier and a second orthography that is a combination of the first and second words of the identifier. For example, the entity identifier "Computer Associates company" will generate by applying this heuristics model the first orthography "Computer", a second orthography "Computer Associates", etc. This model can be refined by ignoring certain words that may be meaningless by themselves. Words such as "First", "The", do not convey sufficient information when used alone. Thus, to avoid the introduction of orthographies unlikely to lead to correct automation no orthographies based solely on these individual words are used. In those circumstances the first orthography will comprise at least a pair of words. For example "The first machine industry" will generate the orthographies "First machine", "First machine industry." etc.

As embodiment and broadly described herein the invention also provides an apparatus for generating a speech recognition vocabulary for use in a speech recognition system, said apparatus comprising:

first memory means for holding a listing of a plurality of entity identifiers, each entity identifier including at least one word that symbolizes a particular meaning, said plurality of entity identifiers being distinguishable from one another based on either one of individual words and combinations of individual words, at least some of said entity identifiers including at least two separate words;

a processor in operative relationship with said first memory means;

a program element providing means for generating for each one of said at least some of said entity identifiers an orthography set including a plurality of orthographies, each orthography in a given set being a composition of different words and at least one of said different words being selected from a respective entity identifier.

As embodied and broadly described herein the invention further provides machine readable medium containing a program element for instructing a computer to generate a speech recognition vocabulary for use in a speech recognition system, said computer including;

first memory means for holding a listing of a plurality of entity identifiers, each entity identifier including at least one word that symbolizes a particular meaning, said plurality of entity identifiers being distinguishable from one another based on either one of individual words and combinations of individual words, at least some of said entity identifiers including at least two separate words;

a processor in operative relationship with said first memory means;

program element providing means for generating for each one of said at least some of said entity identifiers an orthography set including a plurality of orthographies, each orthography in a given set being a composition of different words and at least one of said different words being selected from a respective entity identifier.

As embodied and broadly described herein the invention also provides a machine readable medium containing a speech recognition vocabulary generated by the above described method or apparatus.

DESCRIPTION OF A PREFERRED EMBODIMENT

As an introductory comment it should be pointed out that the invention does not directly relate to the structure and operation of an automated directory assistance system. Rather, the invention is concerned with a method and apparatus for generating a speech recognition vocabulary that can be used in a speech recognition system, such as an automated directory assistance system from a listing of entities potentially recognizable or identifiable by the speech recognition system. For more information on the structure and detailed operation of an automated directory assistance system the reader may refer to the following documents whose contents are hereby incorporated by reference.

U.S. PATENTS

| Patent # | Inventor |
| --- | --- |
| 5,488,652 | Gregory, J. Bielby et al. |
| 4,164,026 | Dubnowski et al. |
| 4,761,737 | Gerson et al. |
| 4,797,910 | Daudelin |
| 4,959,855 | Daudelin |
| 4,979,206 | Padden et al. |
| 5,050,215 | Nishimura |
| 5,052,038 | Shepard |
| 5,091,947 | Ariyoshi et al. |
| 5,097,509 | Lennig |
| 5,127,055 | Larlosy |
| 5,183,083 | Dowden et al. |
| 5,181,237 | Dowden |
| 5,204,894 | Darden |
| 5,274,695 | Green |
| 5,515,475 | Gupta et al. |
| 5,307,444 | Tsuboka |
| 4,751,736 | Gupta et al. |
| 5,226,044 | Gupta et al. |
| 4,956,885 | Lenning et al. |
| 5,390,278 | Gupta et al. |
| 5,088,479 | Taloanaga et al. |

PRIOR ART

| TITLE | AUTHOR | SOURCE |
| --- | --- | --- |
| Dynamic Adaptation of Hidden Markov Model for Robust Speech Recognition | | 1989, IEEE International Symposium on Circuits and Systems vol. 2, May 1989 pp. 1338–1339 |
| Dynamic Modification of the Vocabulary of a Speech Recognition Machine | | IBM Technical Disclosure Bulletin, vol. 27, No. 7A, Dec. 1954 |
| Adaptive Acquisition of Language | Gonn et al. | Computer Speech and Language, vol. 5, No. 2 Apr. 1991, London, GB, pp. 101–132 |
| Automated Bilingual Directory Assistance Trial In Bell Canada | Lenning et al. | IEEE Workshop on Interactive Voice Technology for Telecon Application, Piscataway. NJ. Oct, 1992. |
| Unleashing the Potential of Human-To-Machine Communication | Labov and Lennig. | Telesis, Issue 97, 1993, pp. 23–27 |
| An introduction To Hidden Markov Models | Rabiner and Juang | IEEE ASSP Magazine, Jan. 1966, pp. 4–16 |
| Putting Speech Recognition to Work In The Telephone Network | Lennig. | Computer, published by IEEE Computer Society, vol 23, No. 8, Aug. 1990 |
| Flexible Vocabulary Rocognition of Speech Over The Telephone | Lennig et al. | IEEE Workshop on Interactive Voice Technology for Telecom Applications, Piscataway, NJ, Oct. 1992 |
| Mobile Robot Control by a Structural Hierarchical Neural Network | | Nagata et al. pp. 69–76, 1989 |

-continued

PRIOR ART

| TITLE | AUTHOR | SOURCE |
|---|---|---|
| Large Vocabulary Continuous Speech Recognition: a Review | Steven Young | IEEE Automatic Speech Recognition Workshop, September 16, 1995 |
| Putting Speech Recognition to Work in the Telephone Network | Mathew Lennig | IEEE (August 1990) reprinted from Computer |

The raw data input to the speech recognition dictionary builder is, as mentioned earlier, an electronic version of the white pages. The electronic white pages provide detailed listing information, analogous to the printed version of the white pages. A sample listing is given below:

---

MICROWAVE ANALYSIS INSTITUTE OF COLORADO
Office Locations

5800 E Eldridge Av DENVER 3038220396
6169 S Beacon Wy LITTLETON 3032883963
6402 Galbraith WESTMINSTER 3030579821
200 W County Line Rd HIGHLANDS RANCH 3034492001
2020 Wadsworth Blvd LAKEWOOD 3039924286
Business Office 5800 E Eldridge Av DENVER 3038221423
Analysis Lab 5800 E Eldridge Av DENVER 30362212512
Day Or Night Call DENVER 3036224455

---

Figure 1:
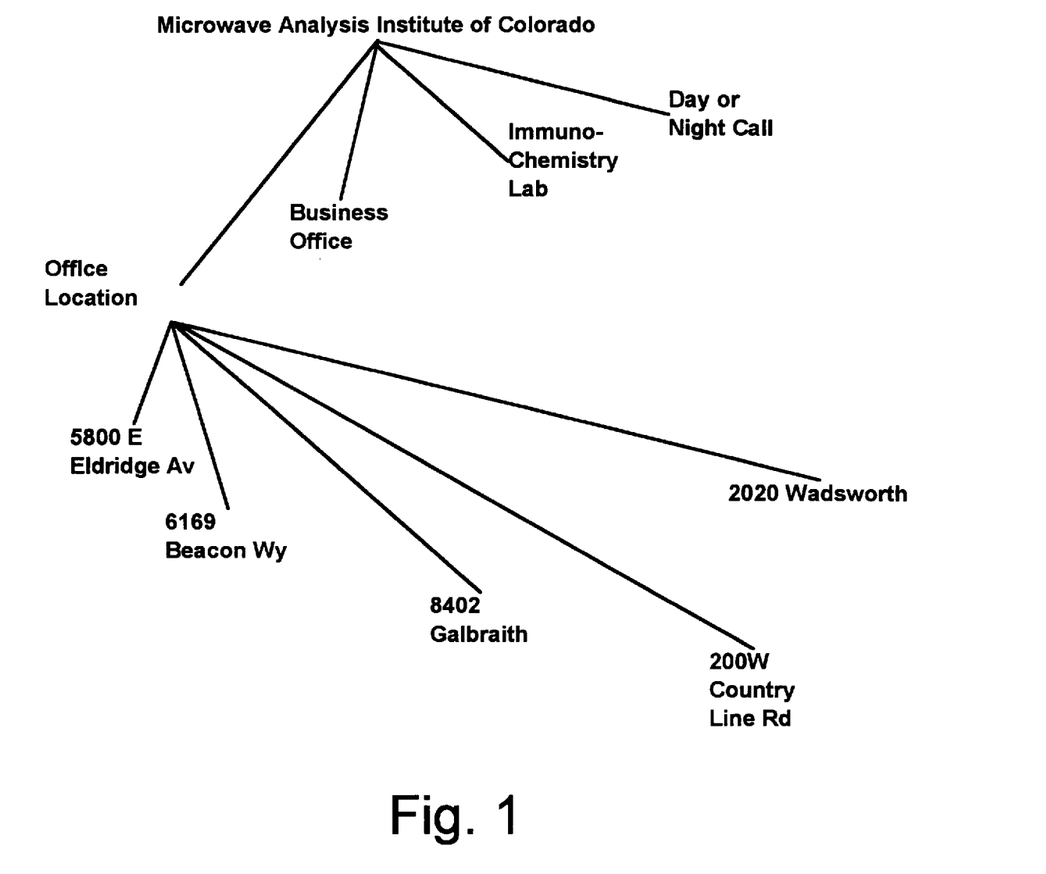
FIG. 1 illustrates a white pages listing entry corresponding to a business organization.

FIG. 1 graphically illustrates the structure of this business organization. The electronic representation of this sample listing is given in the following table:

| ID NUMBER | RANK | NAME | LOCALITY | BUILDING NUMBER | STREET PREFIX | STREET TYPE | STREET | TELEPHONE NUMBER |
|---|---|---|---|---|---|---|---|---|
| 33330 | 0 | Microwave Analysis Institute of Colorado | Denver | | | | | |
| 33331 | 1 | Office Locations | | | | | | |
| 33332 | 2 | | Denver | 5600 | E | AV | Eldridge | 3036220396 |
| 33333 | 2 | | Littleton | 6169 | S | WY | Beacon | 3032833963 |
| 33334 | 2 | | Westminster | 8402 | | | Galbraith | 3030579821 |
| 33335 | 2 | | Highlands Ranch | 200 | X | RD | Country Lane | 3034492001 |
| 33336 | 2 | | Lakewood | 2020 | | BLVD | Wadsworth | 5039924286 |
| 33337 | 1 | Business Office | Denver | 5900 | E | AV | Eldridge | 3036221423 |
| 33338 | 1 | Analysis Lab | Denver | 5800 | E | AV | Eldridge | 3036221251 |
| 33339 | 1 | Day or Night Call | Denver | | | | | 3036224455 |

Each white pages caption set can be represented as a "tree" structure, as shown in the above table: the top-line listing is the root of the tree, and the sub-listings are nodes of the tree. The structure embedded in the white pages caption set specifies the topology of the caption set tree.

It should be noted that the various fields for each record are merely examples of the type of information that is available. The following table provides a more complete, although not exhaustive list of the various fields of information.

| FIELD | EXAMPLE |
|---|---|
| surname field | <kubrick> |
| subsequent name field | <stanley> |
| professional title | <doctor> |

-continued

| FIELD | EXAMPLE |
|---|---|
| lineage assigned to name | <lr> |
| license, academic degrees | <PhD> |
| business description | <master plumber> |
| building number | <16> |
| building number prefix | <N12> |
| building number postfix | <A> |
| street name | <ammand bombardier> |
| street directional prefix | <north> |
| street thoroughfare type | <boulevard> |
| street directional postfix | <east> |
| Locality | <saint lambert> |
| state or province | <part> |
| county | <montenegia> |

VOCABULARY BUILDER

This section describes methods of building the speech recognition lexicon. The lexicon is later phonemically transcribed, mapped into a set of acoustic models, and a speech recognition dictionary is created. Each lexical item, or phrase, attempts to mimic the manner in which directory assistance queries are made. Phrases are generated using heuristics. More specifically, heuristics generate recognition phrases using the text contained in the electronic white pages. However, before processing the white pages entries with heuristics to create the speech recognition lexicon, the white pages data is pre-processed which corresponds to a "cleaning operation", involving the expansion of abbreviations and the removal of non-productive information.

The expansion of abbreviations is effected by using a substitution table. The program which generates the orthographies from the white pages listing observes a number of fields in the listing for occurrences of specific letter combinations known to be abbreviations.

| FIELD | COMBINATION OF LETTERS | SUBSTITUTED WORD(S) |
|---|---|---|
| Name | agcy | agency |
| Title | atty | attorney |
|  | MD | Doctor |
| Street Prefix | S | south |
|  | N | north |
|  | E | east |
|  | W | west |
| Locality | Bouldr | Boulder |
|  | Mtl | Montreal |

Figure 2:
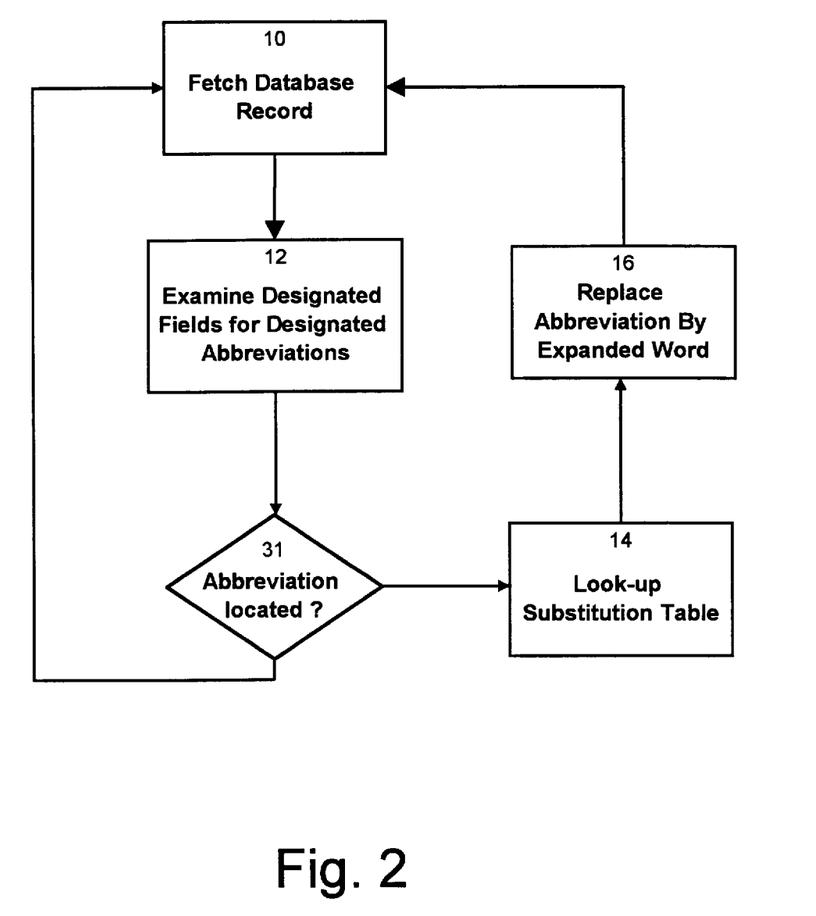
FIG. 2 is a general flow chart of the process for expanding abbreviation in the white pages listing.

This table provides only an example of possible abbreviations and the substituted words that the system can use. In practice, the expansion of the abbreviations is not a complex operation because what the program is looking for, namely the different abbreviations are usually known in advance as they are established actuating to a standard practice of the telephone company. Moreover, the database fields where the abbreviations are likely to be found are usually also known. Thus, it suffices to scan the white pages database looking for the all possible abbreviations. Once an abbreviation is located a substitution table is consulted to find the expansion corresponding to the given abbreviation. That expansion is then inserted in place of the original abbreviation. This process is illustrated in FIG. 2 of the drawings. The program element responsible for the expansion of abbreviations searches at step 10 possible abbreviations that are known in advance in the fields of the database where those abbreviations are likely to be found. When an abbreviation is located at step 12, a substitution table is consulted at step 14 to determine the substitution word. The latter is then inserted at step 16 in the database. The program next fetches the next record of the database and the process repeated until all the records have been examined.

The final step of the "cleaning operation" consists of removing extraneous information that is non-productive in the sense it does not provide any additional information about the particular entity. This process is also effected by scanning the white pages listing database and looking for particular letter combinations or key words. Once such letter combination or key word is located, it is simply erased. Examples of what is considered non-productive information is as follows: "Toll free number", "24 hour service", "Day or night surface", among any other possible letters or words that may be considered superfluous. This operation is effected by using a program element of the type illustrated in FIG. 2. Each field of the database is scanned to locate pre-determined words or phrases and when one of these words or phrases is located it is erased.

The heuristics model used to generate the orthographies of the speech recognition lexicon may vary with the intended application. For example, the heuristics for a simple listing can be as follows:

First word in name field

Full name field

Full name field and street name

Full name field street name less street thoroughfare type information etc.

For example, consider the following entity identifier:

| TYPE OF DATA | DATA |
|---|---|
| ID Number | 28724 |
| Full Name | ABC American Ship Building Company |
| Building Number | 909 |
| Street | Wadsworth |
| Street Type | BLVD |
| Telephone Number | 5146766656 |

Application of the heuristics model (described above) generates the following orthography set:

ABC

ABC American Ship Building Company

ABC American Ship Building Company on Wadsworth Boulevard

ABC American Ship Building Company on Wadsworth

This orthography set includes four individual orthographies each one pointing toward the same telephone number. The first two orthographies contain words related only to the name of the entity, while the last two orthographies are a combination, in other words including information relating to the name of the entity and to the civic address. The word "ABC" is common to all orthographies.

Although this heuristics model is simple, it may sometimes create orthographies that are not likely to match what the user is saying. In some instances, the first word alone in the name field of the entity name may by itself be meaningless. For example in the business "First American ship building company", an orthography containing solely the word "First" may not be very useful because it is unlikely that the user will request the telephone number of that company solely by saying "First". Thus, the model can be refined in two possible ways. One is to identify those non-productive words in an entity name and when a word in the preestablished group is encountered it is not considered. In this example, the program building the speech recognition vocabulary looks for "First" at the beginning of the name and if that word is found it is ignored and only the second word in the name is used to build the first orthography in the set. The second possibility is to create orthographies that include at least a pair of words from the name of the entity, namely the first and the second words. If this heuristics model is applied to the example given above, an orthography set including only three orthographies will be generated, excluding the orthography "ABC."

The table below provides an example of a caption set that is related to a hierarchical organizational structure of the type illustrated in FIG. 1. The heuristics model used to generate the orthography groups also takes into account the rank number field in the white pages database that provides information as to whether the entry is at a root level or constitutes a branch.

| ID NUMBER | RANK | NAME | LOCALITY | BUILDING NUMBER | STREET PREFIX | STREET TYPE | STREET | TELEPHONE NUMBER |
|---|---|---|---|---|---|---|---|---|
| 28724 | 3 | First American Ship Building Company | | | | | | |
| 28725 | 1 | Accounts and Personnel | | 909 | | BLVD | Wadsworth | 2343459067 |
| 28726 | 1 | Arvada Office | | 4851 | | | Independence | 2343455077 |
| 29727 | 1 | Aurora Office | | 2851 | S | RD | Parker | 2345459022 |

The following heuristics model will generate the orthography group below:
   First two words in "Rank 0" name field
   Full "Rank 0" name field
   Full "Rank 0" name field and full "Rank 1" name field
   Full "Rank 0" name field and full "Rank 1" street name
   Full "Rank 0" name field and "Rank 1" street name less street thoroughfare type information etc.

First American
   First American Ship Building Company
   First American Ship Building Company-Accounts and Personnel
   First American Ship Building Company-Wadsworth Boulevard
   First American Ship Building Company-Wadsworth Listings with title information are treated with different heuristics. The title field in the white pages entry is used to store information relating to the profession of the person specified in the name field. Titles include orthopedic surgeons, judges, attorneys, senators, doctors, and dentists. Titles are interpreted using a substitution table. For example, the title "MD OB-GYN & INFERTILITY" is interpreted as "Doctor". A common variant of the usage of title information has been observed: the title can occur in the final position of the phrase. For example, the title at initial position "Dr." becomes "MD" at final position, and phrase initial title "Attorney" becomes phrase final "Attorney at Law". As an example, the following heuristics may be applied to titled listings:
   TITLE+SUBSEQUENT NAME FILED+SURNAME FIELD
   TITLE+SURNAME FIELD
   SUBSEQUENT NAME FIELD+SURNAME FIELD
   SURNAME FIELD
   SUBSEQUENT NAME FIELD+SURNAME FIELD+TITLE For example, the listing <Surname Field: Trine>, <Subsequent Name Field: William A> and <Title: Atty>" will generate the following set of orthographies all pointing toward the same telephone number:
   Attorney William A Trine
   Attorney Trine
   William A Trine
   Trine
   William A Trine, Attorney at Law The above described heuristics models are merely examples of a large number of different possibilities. In general, the heuristics model chosen for the particular application is designed to mimic the way people formulate requests. Simple heuristics models have the advantage of generating a lesser number of orthographies. On the down side, however, they may lead to a less than perfect automation rate because the automated telephone directory assistance system may not be able to recognize all reasonably formulated requests. More refined heuristics models generate a larger number of orthographies that cover more possibilities in terms of request formulations, however these models significantly increase the size of the speech recognition vocabulary which is an important element if one desires to provide real time performance. Thus, the specific heuristics model used to generate the speech recognition vocabulary will need to be adapted to the particular application and may greatly vary from one case to another. In some instances, a single heuristics model may be sufficient for the entire vocabulary generation. In other applications, a combinations of heuristics models may need to be used in dependence of the type of white pages entries to be processed. For example, it the white pages listings contain both single line entries and caption sets it could be advantageous to use different heuristics models applicable to each type of entry.

Figure 3:
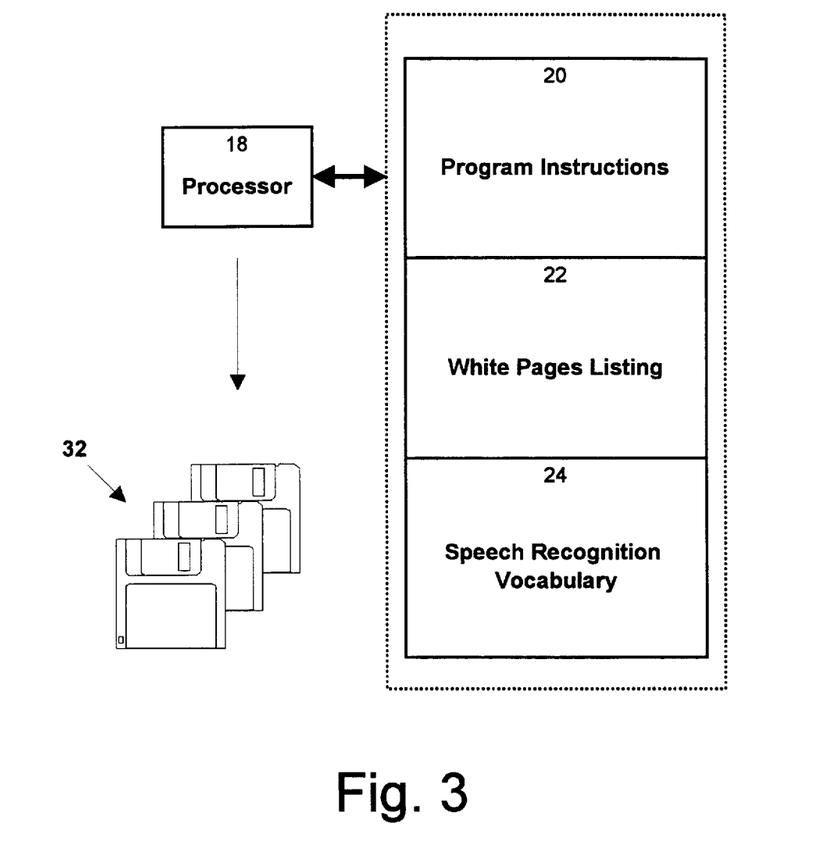
FIG. 3 is a functional block diagram of an apparatus for generating a speech recognition vocabulary from a white pages listing.
Figure 4:
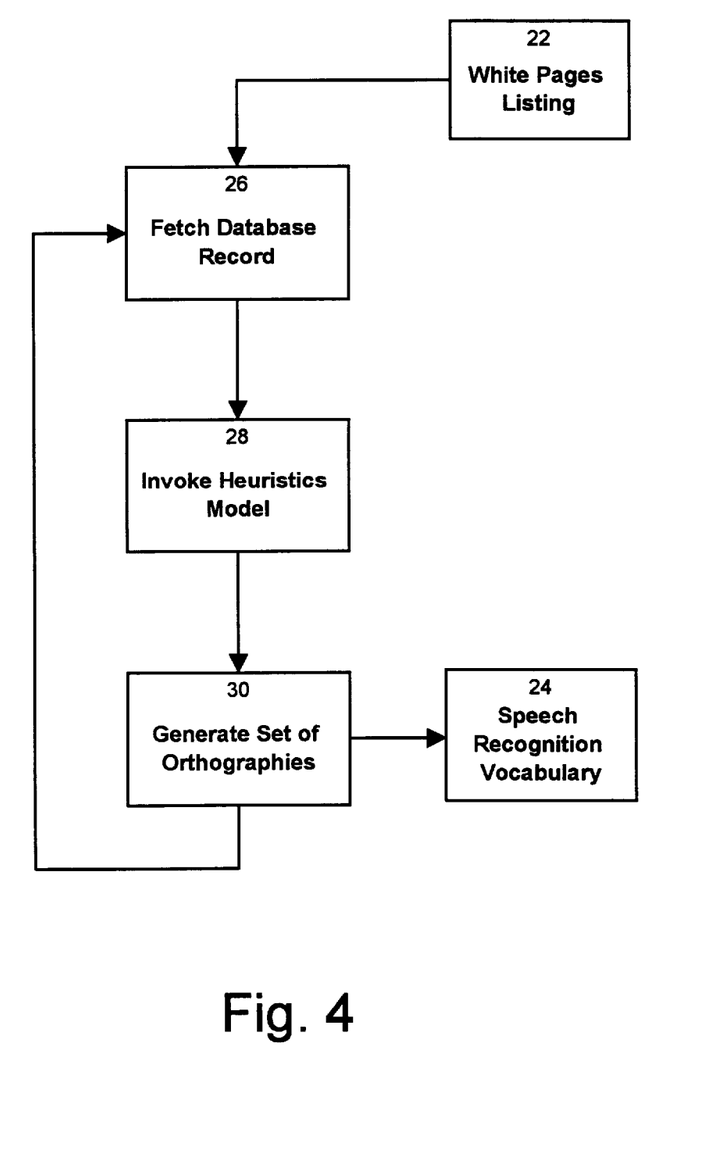
FIG. 4 is a general flow chart of the process for generating the speech recognition vocabulary from a white pages listing.

The apparatus for generating the speech recognition vocabulary is illustrated in FIG. 3. The apparatus includes a processor 18 in operative relationship with a memory having three segments, namely a first segment 20 containing program instructions, a second segment 22 containing white pages listing, and a third segment 24 containing the speech recognition vocabulary. The flow chart illustrating the program operation is shown in FIG. 4. At step 26 a database record is fetched. At step 28 the desired heuristics model is invoked and at step 30 the set of orthographies generated. The set of orthographies are then placed in the third memory segment 24. The speech recognition vocabulary my then be recorded on mass storage 32, if desired.

Next, a dictionary access program of the type known in the art is invoked to generate a "phonemic" transcription for each orthography in the vocabulary. A phonemic transcription is an expressive representation of the sound patterns of a phrase using a set of 41 phoneme symbols (1 symbol for each distinct sound in the English language). This phonemic transcription is transformed into articulatory transcriptions (surface forms), which capture special articulatory phenomena that depend on the context of a phoneme. Then, an acoustic transcription is generated, indicating which acoustic model (represented as a concise mathematical model) should be used during speech recognition. The vocabulary thus transcribed can now be processed by the speech recognition layer of the automated directory assistance system.

The above description of a preferred embodiment should not be interpreted in any limiting manner since variations and refinements can be made without departing from the spirit of the invention. For instance, although an example of the invention has been provided above with strong emphasis on an automated directory assistance system, the method and apparatus for generating the speech recognition vocabulary could also be used in other types of speech recognition systems. The scope of the invention is defined in the appended claims and their equivalents.

We claim:

1. A method for generating a speech recognition dictionary for use in a speech recognition system, the method comprising the steps of:
providing a machine readable medium containing a listing of a plurality of entity identifiers, each entity identifier including at least one word that symbolizes a particular meaning, said plurality of entity identifiers being distinguishable from one another based on either one of individual words and combinations of individual words, at least some of said entity identifiers including at least two separate words;
processing said machine readable medium by a computing device for generating for at least some of said entity identifiers an orthography set including a plurality of orthographies, each orthography being a representation of a spoken utterance, each orthography in a given orthography set being a composition of different words and at least one of said different words being selected from a respective entity identifier;
transcribing said orthography set in the form of data elements forming a data structure capable of being processed by a speech recognition system characterized by an input for receiving a signal derived from a spoken utterance, said speech recognition system being capable of processing the signal and the data structure to select a data element corresponding to an orthography likely to match the spoken utterance and performing a determined action on the basis of the data element likely to match the spoken utterance selected by the speech recognition system;
storing said data structure on a computer readable medium.

2. A method as defined in claim 1, wherein said data element is a representation of a sound made when uttering the orthography associated with the data element.

3. A method as defined in claim 2, wherein the step of transcribing said orthography set includes the step of generating phonemic transcriptions for each orthography in said set.

4. A method as defined in claim 3, wherein the step of transcribing said orthography set further includes the step of converting the phonemic transcriptions into acoustic transcriptions.

5. A method as defined in claim 2, wherein each orthography in said orthography set shares a common word with another orthography in said orthography set.

6. A method as defined in claim 5, wherein each orthography in said orthography set includes a word that is common with every other orthography in said orthography set.

7. A method as defined in claim 2, wherein said listing is a database including a plurality of records, each record including a plurality of information fields, data stored in the information fields for a certain record constituting an entity identifier.

8. A method as defined in claim 7, wherein one of said entity identifiers includes data indicative of a name, said method comprising the step of generating an orthography set including at least one orthography that includes a word common with a word included in said data indicative of a name.

9. A method as defined in claim 7, wherein one of said entity identifiers includes data indicative of a civic address, said method comprising the step of generating an orthography set including at least one orthography that includes a word common with a word included in said data indicative of civic address.

10. A method as defined in claim 7, wherein one of said entity identifiers includes data indicative of a title, said method comprising the step of generating an orthography set including at least one orthography that includes a word common with a word included in said data indicative of a title.

11. A method as defined in claim 7, wherein one of said entity identifiers includes data indicative of a name and data indicative of a civic address, said method comprising the step of generating an orthography set including at least one orthography that includes a word common with a word included in said data indicative of a name and a word common with a word included in said data indicative of a civic address.

12. A method as defined in claim 7, wherein one of said entity identifiers includes data indicative of a name and data indicative of a title, said method comprising the step of generating an orthography set including at least one orthography that includes a word common with a word included in said data indicative of a name and a word common with a word included in said data indicative of a title.

13. A method as defined in claim 7, wherein one of said information fields includes data indicative of a name, said method comprising prior to generating any orthography set effecting the steps of:
scanning said one information field to locate predetermined data;
upon identification of said predetermined data in association with a given record negating said predetermined data from said given record.

14. A method as defined in claim 13, wherein said predetermined data includes combination of words selected from a group consisting of "toll free", "day or night" and "24 hour".

15. A method as defined in claim 7, wherein one of said information fields includes data indicative of a name, said method comprising prior to generating any orthography set effecting the steps of:
scanning said one information field to locate predetermined data;
upon identification of said predetermined data in association with a given record replacing said predetermined data with new data.

16. A method as defined in claim 15, comprising the step of consulting a table that establishes a correspondence between said predetermined data and said new data to identify the new data for replacing said predetermined table.

17. A method as defined in claim 15, wherein said predetermined data is an abbreviation of a word.

18. An apparatus for generating a speech recognition vocabulary for use in a speech recognition system, said apparatus comprising:
first memory means for holding a listing of a plurality of entity identifiers, each entity identifier including at least one word that symbolizes a particular meaning, said plurality of entity identifiers being distinguishable from one another based on either one of individual words and combinations of individual words, at least some of said entity identifiers including at least two separate words;
a processor in operative relationship with said first memory means;
a program element providing means for:
a) generating for at least some of said entity identifiers an orthography set including a plurality of orthographies, each said orthography in a given orthography set being a composition of different words and at least one of said different words being selected from a respective entity identifier;

b) transcribing said orthography set in the form of data elements forming a data structure capable of being processed by a speech recognition system characterized by an input for receiving a signal derived from a spoken utterance, said speech recognition system being capable of processing the signal and the data structure to select a data element corresponding to an orthography likely to match the spoken utterance and performing a determined action on the basis of the data element likely to match the spoken utterance selected by the speech recognitions system.

19. An apparatus as defined in claim 18, wherein each data element is a representation of a sound made when uttering the orthography associated with the data element.

20. An apparatus as defined in claim 19, wherein said program element means for generating a phonemic transcription for the orthographies in said set.

21. An apparatus as defined in claim 20, wherein said program element provides means for converting each phonemic transcription into an acoustic transcription.

22. An apparatus as defined in claim 20, wherein each orthography in said orthography set shares a common word with another orthography in said orthography set.

23. An apparatus as defined in claim 22, wherein each orthography in said orthography set includes a word that is common with every other orthography in said orthography set.

24. An apparatus as defined in claim 23, wherein said listing is a database including a plurality of records, each record including a plurality of information fields, data stored in the information fields for a certain record constituting an entity identifier.

25. An apparatus as defined in claim 24, wherein one of said entity identifiers includes data indicative of a name, said program element including means for generating an orthography set including at least one orthography that includes a word common with a word included in said data indicative of a name.

26. An apparatus as defined in claim 24, wherein one of said entity identifiers includes data indicative of a civic address, said program element including means for generating an orthography set including at least one orthography that includes a word common with a word included in said data indicative of civic address.

27. An apparatus as defined in claim 24, wherein one of said entity identifiers includes data indicative of a title, said program element including means for generating an orthography set including at least one orthography that includes a word common with a word included in said data indicative of a title.

28. An apparatus as defined in claim 24, wherein one of said entity identifiers includes data indicative of a name and data indicative of a civic address, said program element including means for generating an orthography set including at least one orthography that includes a word common with a word included in said data indicative of a name and a word common with a word included in said data indicative of a civic address.

29. An apparatus as defined in claim 24, wherein one of said entity identifiers includes data indicative of a name and data indicative of a title, said program element including means for generating an orthography set including at least one orthography that includes a word common with a word included in said data indicative of a name and a word common with a word included in said data indicative of a title.

30. A machine readable medium containing a program element for instructing a computer to generate a speech recognition vocabulary for use in a speech recognition system, said computer including:

first memory means for holding a listing of a plurality of entity identifiers, each entity identifier including at least one word that symbolizes a particular meaning, said plurality of entity identifiers being distinguishable from one another based on either one of individual words and combinations of individual words, at least some of said entity identifiers including at least two separate words;

a processor in operative relationship with said first memory means;

a program element providing means for:
  a) generating for at least some of said entity identifiers an orthography set including a plurality of orthographies, each said orthography in a given orthography set being a composition of different words and at least one of said different words being selected from a respective entity identifier;
  b) transcribing said orthography set in the form of data elements forming a data structure capable of being processed by a speech recognition system characterized by an input for receiving a signal derived from a spoken utterance, said speech recognition system being capable of processing the signal and the data structure to select a data element corresponding to an orthography likely to match the spoken utterance and performing a determined action on the basis of the data element likely to match the spoken utterance selected by the speech recognition system.

31. A machine readable medium as defined in claim 30, wherein each data element is a representation of the sound made when uttering the orthography associated with the data element.

32. A machine readable medium as defined in claim 31, wherein said program element provides means for generating a phonemic transcription for the orthographies in said set.

33. An apparatus as defined in claim 32, wherein said program element provides means for converting the phonemic transcription into an acoustic transcription.

34. A machine readable medium as defined in claim 31, wherein each orthography in said orthography set shares a common word with another orthography in said orthography set.

35. A machine readable medium as defined in claim 34, wherein each orthography in said orthography set includes a word that is common with every other orthography in said orthography set.

36. A machine readable medium as defined in claim 33, wherein said listing is a database including a plurality of records, each record including a plurality of information fields, data stored in the information fields for a certain record constituting an entity identifier.

37. A machine readable medium as defined in claim 36, wherein one of said entity identifiers includes data indicative of a name, said program element including means for generating an orthography set including at least one orthography that includes a word common with a word included in said data indicative of a name.

38. A machine readable medium as defined in claim 36, wherein one of said entity identifiers includes data indicative of a civic address, said program element including means for generating orthography set including at least one orthography that includes a word common with a word included in said data indicative of civic address.

39. A machine readable medium as defined in claim 36, wherein one of said entity identifiers includes data indicative of a title, said program element including means for generating orthography set including at least one orthography that includes a word common with a word included in said data indicative of a title.

40. A machine readable medium as defined in claim 36, wherein one of said entity identifiers includes data indicative of a name and data indicative of a civic address, said program element including means for generating orthography set including at least one orthography that includes a word common with a word included in said data indicative of a name and a word common with a word included in said data indicative of a civic address.

41. A machine readable medium as defined in claim 36, wherein one of said entity identifiers includes data indicative of a name and data indicative of a title, said program element including means for generating orthography set including at least one orthography that includes a word common with a word included in said data indicative of a name and a word common with a word included in said data indicative of a title.

42. A machine readable medium containing a speech recognition vocabulary generated by the method defined in claim 1.

43. A machine readable medium containing a speech recognition vocabulary generated by the method defined in claim 2.

44. A speech recognition system having a memory which contains a speech recognition vocabulary representing a plurality of orthographies, said speech recognition vocabulary generated by:

providing a computer readable medium containing a listing of a plurality of entity identifiers wherein each entity identifier comprises at least one word that symbolizes a particular meaning, said plurality of entity identifiers being distinguishable from one another based on either one of individual words and combinations of individual words, at least some of said entity identifiers including at least two separate words;

generating for at least some of said entity identifiers an orthography set including a plurality of orthographies, each said orthography in a given orthography set being a composition of different words and at least one of said different words being selected from a respective entity identifier;

storing said orthography set on a computer readable medium in a format such that the orthographies of said orthography set are potentially recognizable by a speech recognition system on a basis of a spoken utterance by a user.

45. A speech recognition system as defined in claim 44, wherein each orthography in said orthography set shares a common word with another orthography in said orthography set.

46. A speech recognition system as defined in claim 45, wherein each orthography in said set includes a word that is common with every other orthography in said set.

47. A speech recognition system as defined in claim 44, wherein said listing is a database including a plurality of records, each record including a plurality of information fields, data stored in a information fields for a certain record constituting an entity identifier.

48. A speech recognition system as defined in claim 47, wherein one of said entity identifiers includes data indicative of a name, said system comprising a means for generating an orthography set including at least one orthography that includes a word common with a word included in said data indicative of a name.

49. A speech recognition system as defined in claim 47, wherein one of said entity identifiers includes data indicative of a civic address, said system comprises a means for generating an orthography set including at least one orthography that includes a word common with a word included in said data indicative of civic address.

50. A speech recognition system as defined in claim 47, wherein one of said entity identifiers includes data indicative of a title, said system comprising a means for generating an orthography set including at least one orthography that includes a word common with a word including in said data indicative of a title.

51. A speech recognition system as defined in claim 47, wherein one of said entity identifiers includes data indicative of a name and data indicative of a civic address, said system comprising a means for generating an orthography set including at least one orthography that includes a word common with a word included in said data indicative of a name and a word common with a word included in said data indicative of a civic address.

52. A speech recognition system as defined in claim 47, wherein one of said entity identifiers includes data indicative of a name and data indicative of a title, said system comprising a means for generating an orthography set including at least one orthography that includes a word common with a word included in said data indicative of a name and a word common with a word included in said data indicative of a title.

53. A speech recognition system as defined in claim 47, wherein one of said information fields includes data indicative of a name, said system comprising a means for effecting the steps of:

scanning said one information field to locate predetermined data;

upon identification of said predetermined data in association with a given record negating said predetermined data from said given record.

54. A speech recognition system as defined in claim 53, wherein said predetermined data includes combination of words selected from the group consisting of "toll free", "day or night" and "24 hour".

55. A speech recognition system as defined in claim 47, wherein one of said information fields includes data indicative of a name, said system comprising a means for effecting the steps of:

scanning said one information field to locate predetermined data;

upon identification of said predetermined data in association with a given record replacing said predetermined data with new data.

56. A speech recognition system as defined in claim 55, comprising a means for consulting a table that establishes a correspondence between said predetermined data and said new data to identify the new data for replacing said predetermined table.

57. A speech recognition system as defined in claim 55, wherein said predetermined data is an abbreviation of a word.

* * * * *

UNITED STATES PATENT AND TRADEMARK OFFICE
CERTIFICATE OF CORRECTION

PATENT NO. : 5,839,107
DATED : November 17, 1998
INVENTOR(S) : Gupta et al.

Page 1 of 2

It is certified that error appears in the above-identified patent and that said Letters Patent is hereby corrected as shown below:

Column 3, line 48, change "Cart" to --Cars--.
Column 4, line 33, change "embodiment" to --embodied--.
Column 6, line 14, Column Patent No., change "4,164,026" to --4,164,025--.
Column 6, line 15, Column Patent No., change "4,761,737" to --4,751,737--.
Column 6, line 24, Column Inventor, change "Larlosy" to --Larkey--.
Column 6, line 25, Column Patent No., change "5,183,083" to --5,163,083--.
Column 6, line 33, Column Patent No., change "4,956,885" to 4,956,865--.
Column 6, line 35, Column Patent No., change "5,088,479" to --5,086,479--,
Column 6, line 35, Column Inventor, change "taloanaga et al" to --Takenaga et al--.
Column 6, table Prior Art, Column Source, approximately line 47, change "pp. 1338-1339" to --pp. 1336-1339--.
Column 6, table Prior Art, Column Author, approximately line 50, change "Gonn et al" to --Gorin et al--.
Column 6, table Prior Art, Column Source, approximately line 58, change "IEEE ASSP Magazine, Jan. 1966, pp. 4-16" to --IEEE ASSP Magazine, Jan. 1986, pp. 4-16--.

UNITED STATES PATENT AND TRADEMARK OFFICE
CERTIFICATE OF CORRECTION

PATENT NO. : 5,839,107
DATED : November 17, 1998
INVENTOR(S) : Gupta et al.

It is certified that error appears in the above-identified patent and that said Letters Patent is hereby corrected as shown below:

Column 6, paragraph Prior Art, Column Title, approximately line 63, change "Flexible Vocabulary Rocognition" to --Flexible Vocabulary Recognition--.
Column 7, line 23, change "6402 Galbraith" to --8402 Galbraith--.
Column 8, line 20, Column Example, change "ammand bombardier" to --armand bombardier--.
Column 8, line 24, Column Example, change "part" to --texas--.
Column 8, line 25, Column Example, change "montenegia" to --monteregie--.
Columns 7 and 8, Column Building Number, approximately line 40, change "5600" to --5800--.
Columns 7 and 8, Column Street Prefix, approximately line 43, change "X" to --W--.
Columns 7 and 8, Column Building Number, approximately line 46, change "5900" to --5800--.
Column 11, Column ID Number Rank, approximately line 5, change "3" to --0--.
Column 12, Column Telephone Number, approximately line 7, change "2343459067" to --2343459087--.

Signed and Sealed this

Thirteenth Day of April, 1999

Q. TODD DICKINSON

*Attest:*

*Attesting Officer*

Acting Commissioner of Patents and Trademarks